F. S. BIRTWHISTLE.
WALL OR SWITCH BOX.
APPLICATION FILED APR. 27, 1909.
965,275. Patented July 26, 1910.
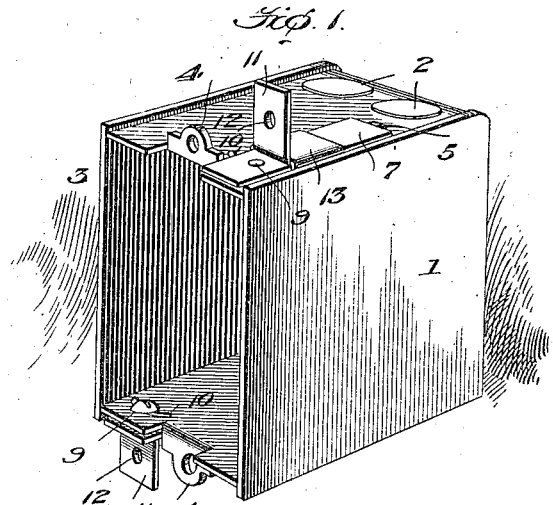
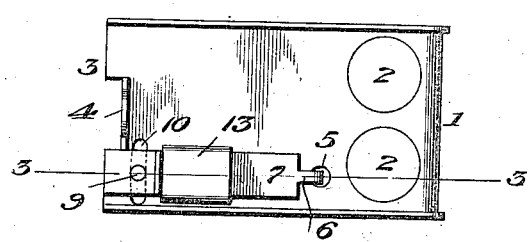
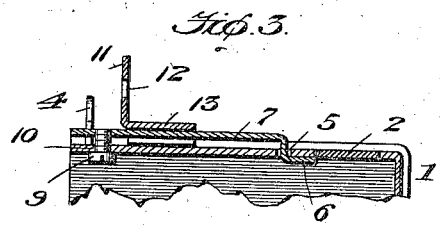
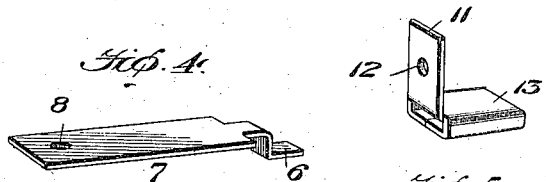 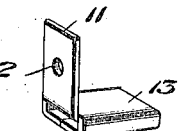
Witnesses 
Inventor
Frederick S. Birtwhistle
By 
Attorney

UNITED STATES PATENT OFFICE.

FREDERICK S. BIRTWHISTLE, OF TROY, NEW HAMPSHIRE.

WALL OR SWITCH BOX.

965,275.  Specification of Letters Patent.  Patented July 26, 1910.

Application filed April 27, 1909. Serial No. 492,583.

*To all whom it may concern:*

Be it known that I, FREDERICK S. BIRTWHISTLE, a citizen of the United States, residing at Troy, county of Cheshire, and State of New Hampshire, have invented certain new and useful Improvements in Wall or Switch Boxes, of which the following is a specification.

My invention relates to wall or switch boxes.

The ordinary wall or switch box is installed before the lathing or plaster is put on and is set sufficiently far out (a matter of guess work) as will compensate for the thickness of the lath and plaster so that when the wires are connected up to the switch and the face plate is put in position, the face plate will be flush with the outer face of the wall. As a matter of fact, it very frequently happens that these boxes are set too far out or too far back or their mouths are not positioned just parallel to the wall and thus tedious adjusting of the box becomes necessary when the electrician places the switch and face plate, such extra work resulting in decrease of the profit of the installation which is very considerable if the job be a large one.

The present invention has for its object the provision of a wall or switch box attachment which can be applied to the ordinary box, or may be manufactured in connection therewith at the outset, possessing novel features whereby the box may be adjusted with facility in or out or sidewise or cornerwise to any desired extent and exactly positioned so that when the switch and face plate are placed, the parts will be in the desired position.

The invention is carried out by the provision of certain novel features and constructions, as well as combinations of parts, which are set forth fully hereinafter and recited in the appended claims.

In the accompanying drawings:—Figure 1 is a perspective of a switch or wall box provided with my invention; Fig. 2, a plan view; Fig. 3, a section on line 3—3 of Fig. 2; Fig. 4, a detail of the guide and clamp; and Fig. 5, a detail of the adjustable lug.

A wall or switch box is shown at 1 as having the usual knock-outs 2 and mouth 3 which faces outwardly when the box is in position so that it will receive the switch. For the connection of the switch there are provided the lugs 4. As previously set forth, this form of box is set in position before the laths and plaster are applied and it is a matter of guess work as to whether the mouth 3 will be flush with the outer face of the plaster. If it is not flush, the electrician has to spend considerable time adjusting it.

At one or more corners of the box I provide my novel attachment. A hole 5 is drilled in the box and in this is inserted the bent end 6 of a combined guide and clamp 7, the other end of the guide and clamp having a screw-threaded aperture 8, which receives a screw 9 whose shank lies in an arc-shaped slot 10 in the box 1. There is provided a lug 11 having an aperture 12 and a loop 13 which embraces the guide and clamp 7 and enables the lug to be slid lengthwise to any desired position where it is clamped by tightening the screw 9, which thereupon draws the guide and clamp 7 toward the box and binds the loop 13 against the box. It will also be seen that the end 6 is pivoted in the hole 5 and hence, the entire guide and clamp can be swung laterally as may be desired. The screws 9 are at the mouth of the box so that they can be conveniently tightened or loosened by an ordinary screw-driver.

The box is originally installed with the wires led thereinto through such of the knock-outs 2 as have been used, the screws to fasten the box to the studding or other wood work being passed through the opening 12. When the electrician who connects up the switches reaches the box after the lath and plaster have been applied to the wall, he may find that the mouth of the box is either out or in too far. All that is necessary to bring about the desired position of the box is to loosen the screws 9 and adjust the box laterally or longitudinally as may be desired to bring its mouth flush with the surface of the wall. The screws are then tightened and the installation completed.

The present invention is adapted for use on any kind of a box for electrical connections or mechanisms and is just as well adapted, with any desired modifications, to junction, outlet, and other boxes as for use on switch and wall boxes. Where the box is not intended to contain a switch or other piece of mechanism, the lugs 4 would not be used. The invention is susceptible of various modifications to adapt it to different uses on boxes of the character set forth and I do not limit myself to the use of the invention on any particular kind of box nor to the specific construction set forth.

Having thus described my invention, what I claim as new and desire to secure by Letters Patent, is:—

1. A wall or switch box having guides movable in relation thereto; attaching lugs carried by and adjustable in relation to said guides, and means for securing the said guides in different adjusted positions.

2. A wall or switch box having movable combined clamps and guides, attaching lugs carried by and adjustable on said combined clamps and guides, parts of which are disposed between the clamps and the box, and means for clamping the guides and lugs to the box.

3. A wall or switch box having attaching lugs which are adjustable both lengthwise and crosswise of the box and means located adjacent the mouth of the box adapted for effecting such adjustments.

4. A wall or switch box having pivoted attaching lugs, and means adjustable from the interior of the box for securing said lugs where adjusted.

5. A wall or switch box having flexible combined clamps and guides, lugs adjustable on said clamps and guides, and means for tensioning the combined clamps and guides to clamp the lugs in adjusted position against the box.

6. A wall or switch box having flexible combined clamps and guides, lugs adjustable on said clamps and guides, and screws located adjacent the mouth of the box which are adapted to tension the combined clamps and guides and clamp the lugs against the box.

7. A wall or switch box having pivoted combined clamps and guides, attaching lugs carried by said guides and adjustable lengthwise thereof having a part disposed between the guide and box, and screws for clamping the guides in different positions and thereby clamping the lugs against the box.

In testimony whereof, I hereunto affix my signature in presence of two witnesses.

FREDERICK S. BIRTWHISTLE.

Witnesses:
  JOHN E. ALLEN,
  PHILIP H. FAULKNER.